(12) United States Patent
Perez et al.

(10) Patent No.: US 6,420,024 B1
(45) Date of Patent: *Jul. 16, 2002

(54) CHARGED MICROFIBERS, MICROFIBRILLATED ARTICLES AND USE THEREOF

(75) Inventors: Mario A. Perez, Burnsville; Betty Z. Mei, Woodbury, both of MN (US); Michael D. Swan, St Germain en Laye (FR)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/746,355

(22) Filed: Dec. 21, 2000

(51) Int. Cl.⁷ .................................................. D01F 6/00
(52) U.S. Cl. ...................................... 428/359; 428/397
(58) Field of Search ............................... 428/370, 364, 428/359, 399

(56) References Cited

U.S. PATENT DOCUMENTS

| | | |
|---|---|---|
| RE30,782 E | 10/1981 | van Turnhout |
| 4,330,499 A | 5/1982 | von und zu Aufsess et al. |
| RE31,285 E | 6/1983 | van Turnhout et al. |
| 4,588,537 A | 5/1986 | Klaase et al. |
| RE32,171 E | 6/1986 | van Turnhout |
| 4,595,738 A | 6/1986 | Hufnagel et al. |
| 4,626,263 A | 12/1986 | Inoue et al. |
| 4,652,282 A | 3/1987 | Ohmori et al. |
| 4,675,582 A | 6/1987 | Hommes et al. |
| 4,714,716 A | 12/1987 | Park |
| 4,789,504 A | 12/1988 | Ohmori et al. |
| 4,825,111 A | 4/1989 | Hommes et al. |
| 4,853,602 A | 8/1989 | Hommes et al. |
| 4,916,198 A | 4/1990 | Scheve et al. |
| 4,940,736 A | 7/1990 | Alteepping et al. |
| 5,015,676 A | 5/1991 | Macholdt et al. |
| 5,015,767 A | 5/1991 | Maignan et al. |

(List continued on next page.)

FOREIGN PATENT DOCUMENTS

| | | |
|---|---|---|
| EP | 0 375 781 A1 | 7/1990 |
| WO | WO 95/05501 | 2/1995 |
| WO | WO 97/07272 | 2/1997 |
| WO | WO 97/49326 | 12/1997 |
| WO | WO 99/06622 | 2/1999 |
| WO | WO 99/36466 | 7/1999 |
| WO | WO 99/61520 | 12/1999 |
| WO | WO 00/00520 | 1/2000 |
| WO | WO 00/46435 | 8/2000 |
| WO | WO 00/68301 | 11/2000 |

OTHER PUBLICATIONS

J.I. Raukola, "A New Technology To Manufacture Polypropylene Foam Sheet and Biaxially Oriented Foam Film", VTT Publications 361, Technical Research Center of Finland (1998).

Jones et al., "Crystalline Forms of Isotactic Polypropylene", *Makromol. Chem.*, vol. 75, 134–158 (1964).

(List continued on next page.)

Primary Examiner—N. Edwards
(74) Attorney, Agent, or Firm—Kent S. Kokko

(57) ABSTRACT

Charged, high-strength, high-modulus, melt-processed microfibers, films having a charged, microfibrillated surface, and methods of making the same are described. Charged microfibrillated articles of the invention can be prepared by imparting fluid energy, typically in the form of high-pressure water jets, to a highly oriented, highly crystalline, melt processed film to liberate microfibers or microfibrous flakes therefrom. Microfibrillated articles of the invention find use as tape backings, in the preparation of woven or nonwoven articles, filters for particulate contaminants, such as face masks and water or air filters, fibrous mats, such as those used for removal of oil from water, wipes for dust or debris removal, and thermal and acoustical insulation.

9 Claims, 6 Drawing Sheets

10 μm

U.S. PATENT DOCUMENTS

| | | |
|---|---|---|
| 5,021,473 A | 6/1991 | Macholdt et al. |
| 5,036,262 A | 7/1991 | Schonbach |
| 5,051,225 A | 9/1991 | Hommes et al. |
| 5,057,710 A | 10/1991 | Nishiura et al. |
| 5,069,994 A | 12/1991 | Gitzel et al. |
| 5,072,493 A | 12/1991 | Hommes et al. |
| 5,112,677 A | 5/1992 | Tani et al. |
| 5,147,748 A | 9/1992 | Gitzel et al. |
| 5,258,220 A | 11/1993 | Joseph |
| 5,472,481 A | 12/1995 | Jones et al. |
| 5,496,507 A | 3/1996 | Angadjivand et al. |
| 5,554,722 A | 9/1996 | Eichenauer et al. |
| 5,558,809 A | 9/1996 | Groh et al. |
| 5,605,936 A | 2/1997 | DeNicola, Jr. et al. |
| 5,871,845 A | 2/1999 | Dahringer et al. |
| 5,908,598 A | 6/1999 | Rousseau et al. |
| 5,919,847 A | 7/1999 | Rousseau et al. |
| 5,968,635 A | 10/1999 | Rousseau et al. |
| 5,976,208 A | 11/1999 | Rousseau et al. |
| 5,998,308 A | 12/1999 | Cohen |
| 6,002,017 A | 12/1999 | Rousseau et al. |
| 6,013,587 A | 1/2000 | Truong et al. |
| 6,110,251 A | 8/2000 | Jackson et al. |
| 6,110,588 A | 8/2000 | Perez et al. |
| 6,123,752 A | 9/2000 | Wu et al. |

OTHER PUBLICATIONS

J. Karger–Kocsis, "Polypropylene: Structure, Blends and Composites", vol. 1, 130–131 (1994).

R.S. Porter et al. "Uniaxial Extension and Order Development in Flexible Chaim Polymers", *Journal of Macromolecular Science–Rev. Macromol. Chem. Phys.,* C35(1), 63–115 (1995).

S. Piccarolo et al., "Crystallization of Polymer Melts Under Fast Cooling. II. High–Purity iPP", *Journal of Applied Polymer Science*, vol. 46, 625–634 (1992).

10 μm

10 μm

10 μm

10 µm

CHARGED MICROFIBERS, MICROFIBRILLATED ARTICLES AND USE THEREOF

FIELD OF THE INVENTION

The present invention relates to electrostatically charged, high-strength, high-modulus, melt-processed microfibers, films having a charged, microfibrillated surface, and methods of making the same. Charged microfibers of the invention can be prepared by imparting fluid energy, typically in the form of high-pressure water jets, to a highly oriented, highly crystalline, melt processed film to liberate microfibers therefrom. Microfibrillated films of the invention find use as tape backings, filters for particulate contaminants, such as face masks and water or air filters, fibrous mats, such as those used for removal of oil from water and those used as wipes, and thermal and acoustical insulation. Microfibers of the invention, when removed from the film matrix may be used in the preparation of woven or nonwoven articles and used as wipes for the removal of debris or dust from a surface.

BACKGROUND OF THE INVENTION

Polymeric fibers have been known essentially since the beginnings of commercial polymer development. The production of polymer fibers from polymer films is also well known. In particular, the ease with which films produce fibers (i.e., fibrillate) can be correlated to the degree of molecular orientation of the polymer fibrils that make up the film.

Orientation of crystalline polymeric films and fibers has been accomplished in numerous ways, including melt spinning, melt transformation (co)extrusion, solid state coextrusion, gel drawing, solid state rolling, die drawing, solid state drawing, and roll-trusion, among others. Each of these methods has been successful in preparing oriented, high modulus polymer fibers and films. Most solid-state processing methods have been limited to slow production rates, on the order of a few cm/min. Methods involving gel drawing can be fast, but require additional solvent-handling steps. A combination of rolling and drawing solid polymer sheets, particularly polyolefin sheets, has been described in which a polymer billet is deformed biaxially in a two-roll calender then additionally drawn in length (i.e., the machine direction). Methods that relate to other web handling equipment have been used to achieve molecular orientation, including an initial nip or calender step followed by stretching in both the machine direction or transversely to the film length.

Liberating fibers from oriented, high-modulus polymer films, particularly from high molecular weight crystalline films, has been accomplished in numerous ways, including abrasion, mechanical plucking by rapidly-rotating wire wheels, impinging water-jets to shred or slit the film, and application of ultrasonic energy. Water jets have been used extensively to cut films into flat, wide continuous longitudinal fibers for strapping or reinforcing uses. Ultrasonic treatment of oriented polyethylene film in bulk (that is, a roll of film immersed in a fluid, subjected to ultrasonic treatment for a period of hours) has been shown to produce small amounts of microfibrils.

SUMMARY OF THE INVENTION

The present invention is directed to novel charged, highly oriented, melt processed polymeric microfibers having an effective average diameter less than 20 microns, generally from 0.01 microns to 10 microns, and substantially rectangular in cross section, having a transverse aspect ratio (width to thickness) of from 1.5:1 to 20:1, and generally about 3:1 to 9:1. Since the microfibers are substantially rectangular, the effective diameter is a measure of the average value of the width and thickness of the microfibers.

The rectangular cross-sectional shape advantageously provides a greater surface area (relative to fibers of the same diameter having round or square cross-section) making the microfibers (and microfibrillated films) especially useful in applications such as filtration and as reinforcing fibers in cast materials. The surface area is generally greater than about 0.25 $m^2$/gram, typically about 0.5 to 30 $m^2$/g. The electrostatic charge imparted to the microfibers (or microfibrillated article) enhances the filtration efficiency. Further, due to their highly oriented morphology, the microfibers of the present invention have very high modulus, for example typically above $10^9$ MPa for polypropylene fibers, making them especially useful as reinforcing fibers in thermoset resin and concrete.

The present invention is further directed toward the preparation of highly-oriented films having a charged microfibrillated surface by the steps of providing a highly oriented, voided, non-conductive semicrystalline polymer film, microfibrillating said voided polymer film by imparting a high pressure fluid jet energy, and thereby imparting a charge to the microfibrillated surface. Surprisingly, it has been found that the microfibrillation of the polymer film imparts an electrostatic charge to the microfibrillated surface without the need for post-microfibrillation processing such as corona discharge treatment. Thus, the present invention provides an efficient process whereby charged microfibers (or microfibrous flakes) may be prepared in one step from highly oriented films by imparting fluid jet pressure to the surface of the film.

The voided film may be a microvoided film, a voided film prepared from an immiscible mixture of a semicrystalline polymer or may be a foam prepared from a high melt strength polymer. As used herein, the term "film" shall also encompass sheets, including foamed sheets and it may also be understood that other configurations and profiles such as tubes may be provided with a microfibrillated surface with equal facility using the process of this invention.

As used herein, the term "microfibrillated article" refers to an articles, such as a film or sheet bearing a microfibrillated surface. The charged, microfibrillated surface may comprise microfibers prepared from uniaxially oriented films, or may comprise a schistose surface of microfibrous flakes, prepared from biaxially oriented films. Optionally the microfibers or microfibrous flakes may be harvested from the microfibrillated surface of the film. For brevity, the term microfiber may be used to refer additionally to the microfibrous flakes.

Advantageously the process of the invention is capable of high rates of production, is suitable as an industrial process and uses readily available polymers. The microfibers and microfibrillated articles of this invention, having extremely small fiber diameter and both high strength and modulus, are useful as tape backings, strapping materials, films with unique optical properties and high surface area, low density reinforcements for thermosets, impact modifiers or crack propagation prevention in matrices such as concrete, and as fibrillar forms (dental floss or nonwovens, for example). When imparted with a charge, by either corona treatment or microfibrillation with high-pressure water jets, the resulting charged microfibers (or microfibrillated articles) are particularly useful in filtration applications, and as wipes for the removal of dusts and other debris from surfaces.

DETAILED DESCRIPTION

Figure 1:
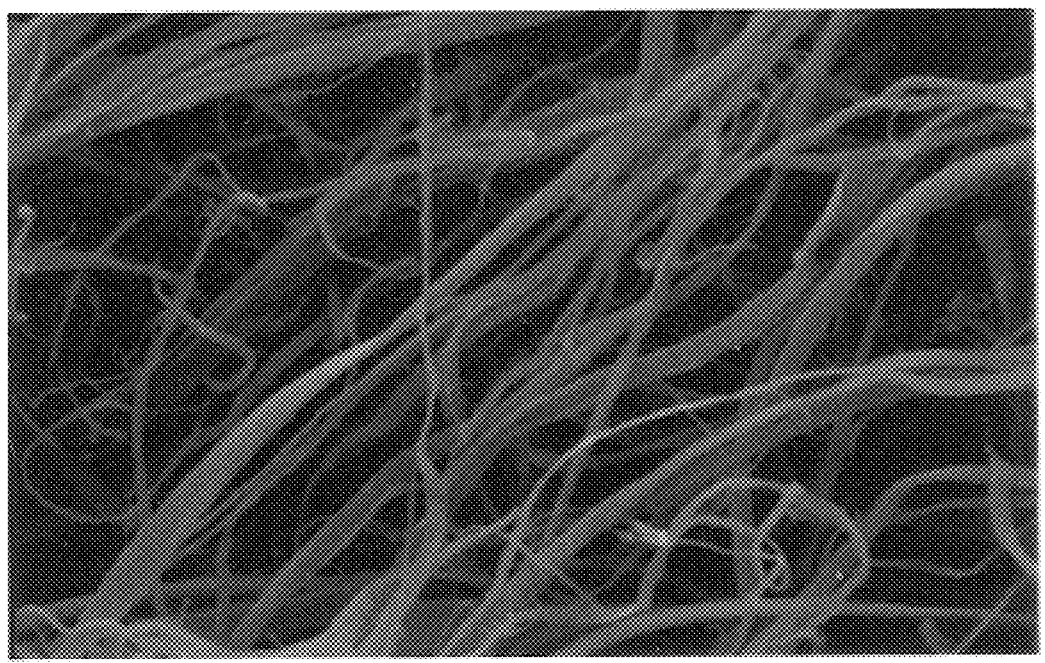
FIG. 1 is a digital image of a scanning electron micrograph of microfibers at 1000× magnification derived from a microvoided film.
Figure 2:
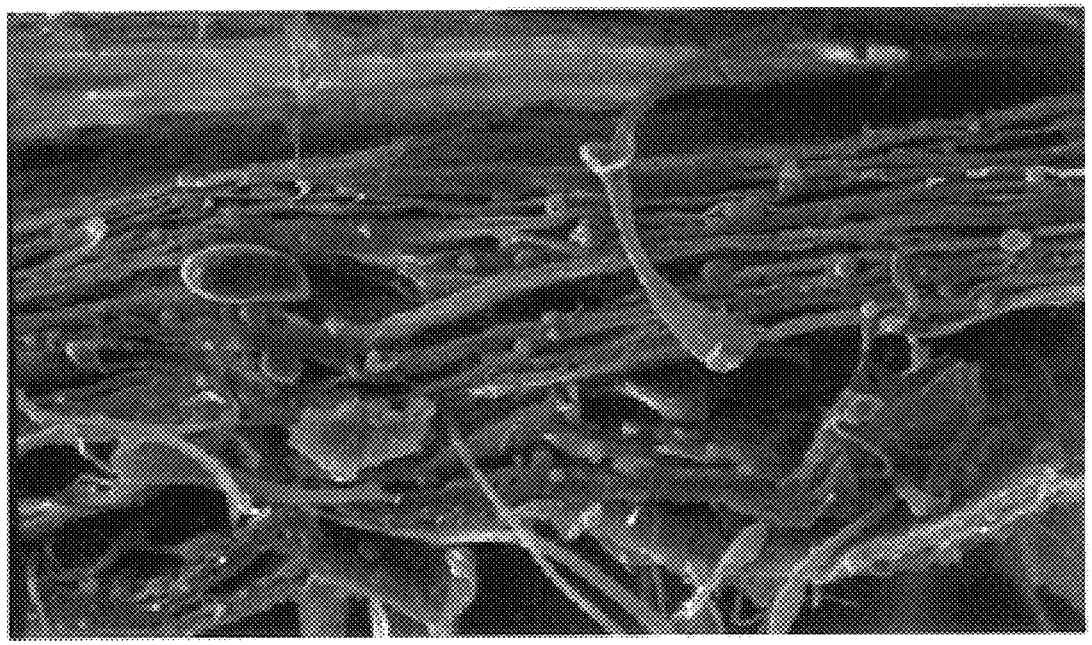
FIG. 2 is a digital image of a scanning electron micrograph of a microfibrillated article derived from a biaxially oriented film containing void-initiating particles.
Figure 3:
FIG. 3 is a digital image of a scanning electron micrograph of a microfibrillated article derived from a uniaxially oriented, high-melt strength foam.
Figure 4:
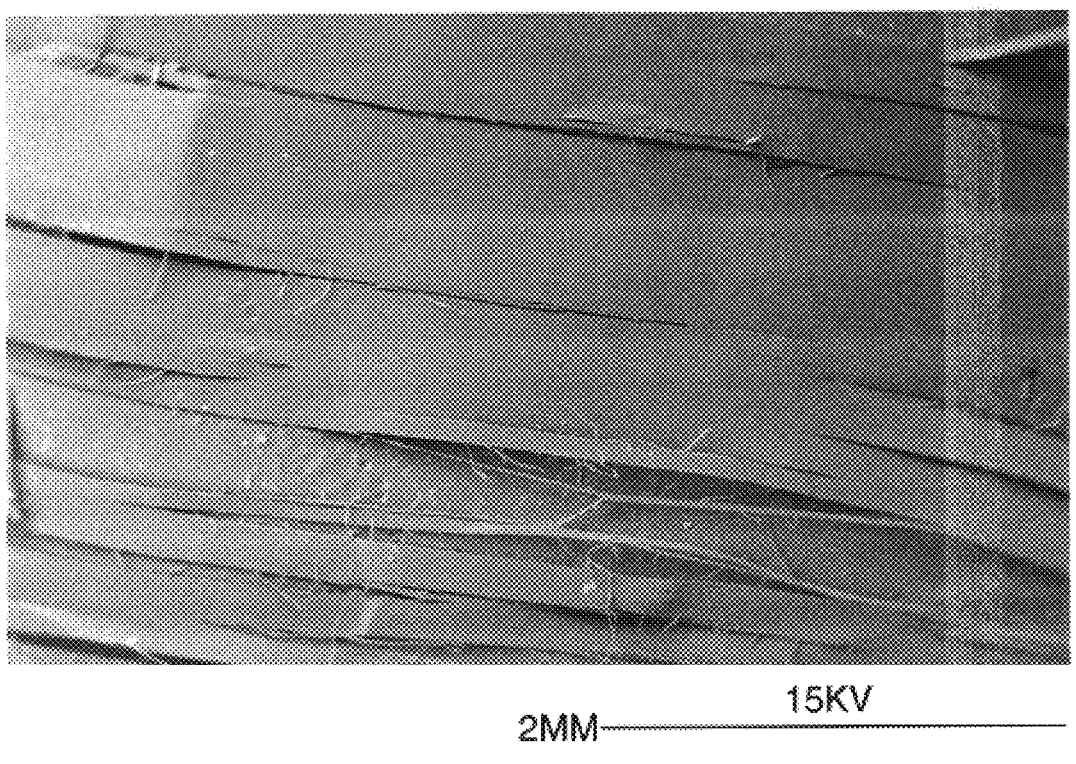
FIG. 4 is a digital image of a scanning electron micrograph of a microfibrillated article of Example 1.
Figure 5:
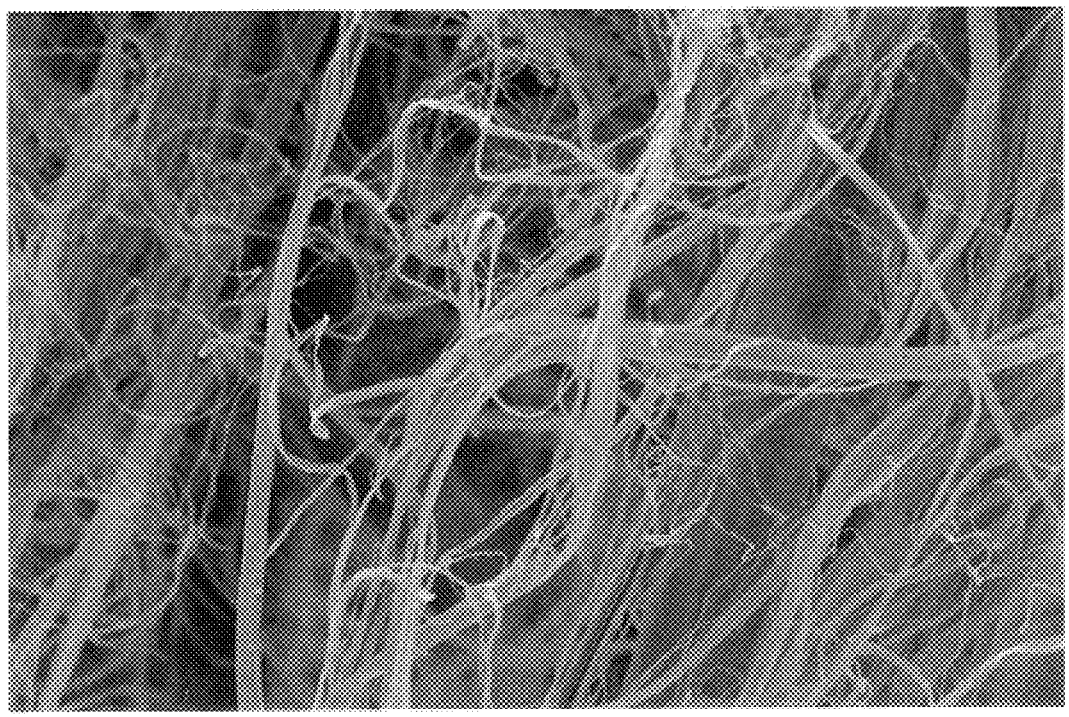
FIG. 5 is a digital image of a scanning electron micrograph of a microfibrillated article of Example 5.
Figure 6:
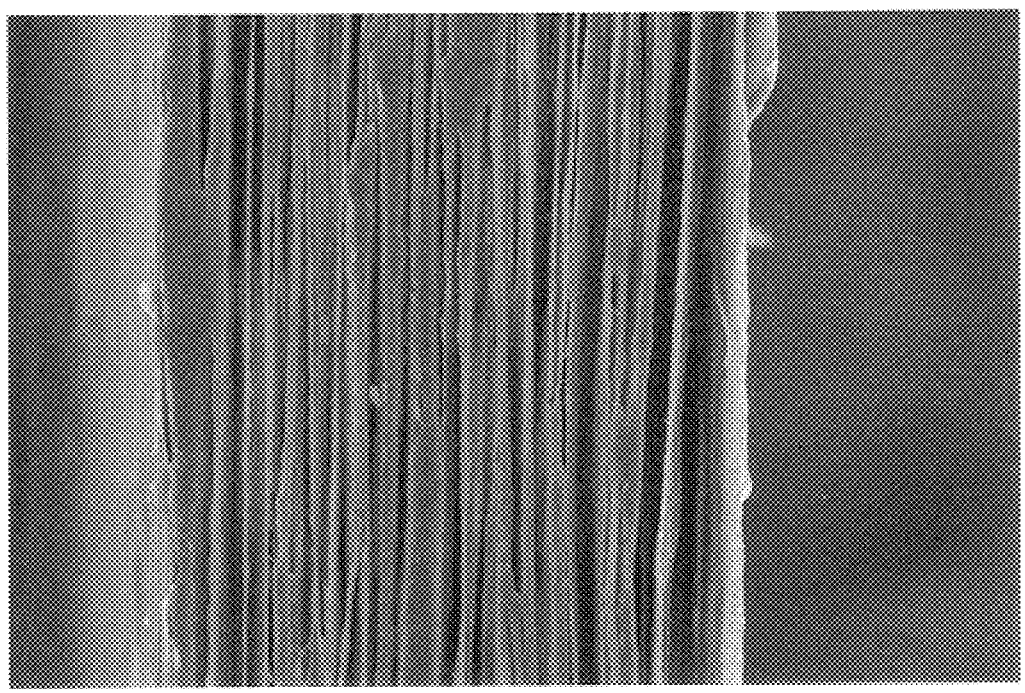
FIG. 6 is a digital image of a scanning electron micrograph of the oriented film of Example 8, prior to microfibrillation.

Semicrystalline polymers useful in the present invention include, but are not limited to, high and low density polyethylene, polypropylene, polyoxymethylene, poly (vinylidine fluoride), poly(methyl pentene), poly(ethylene-chlorotrifluoroethylene), poly(vinyl fluoride), poly(ethylene oxide), poly(ethylene terephthalate), poly(butylene terephthalate), nylon 6, nylon 6,6, nylon 6,12, polybutene, and thermotropic liquid crystal polymers. Examples of suitable thermotropic liquid crystal polymers include aromatic polyesters which exhibit liquid crystal properties when melted and which are synthesized from aromatic diols, aromatic carboxylic acids, hydroxycarboxylic acids, and other like monomers. Typical examples include a first type consisting of parahydroxybenzoic acid (PHB), terephthalic acid, and biphenol; a second type consisting of PHB and 2,6-hydroxynaphthoic acid; and a third type consisting of PHB, terephthalic acid, and ethylene glycol. Preferred polymers are polyolefins such as polypropylene and polyethylene that are readily available at low cost and can provide highly desirable properties in the microfibrillated articles such as high modulus and high tensile strength.

Where charged microfibers, or charged microfibrillated articles are desired, useful semicrystalline polymers include those capable of having a high quantity of trapped charged when microfibrillated by imparted a high pressure fluid jet to the oriented film surface. Examples of polymers capable of acquiring a charge include polyolefins such as polypropylene, polyethylene and poly(4-methyl-1-pentene); polyvinyl chloride; polystyrene; polycarbonates and polyesters, as well as copolymers and blends thereof.

Useful polymers are generally non-conductive, i.e. having a volume resistivity of at least $10^{14}$ ohm-cm, preferably greater than $10^{15}$ ohm-cm. That a particular polymer is capable of having a charge imparted thereto can be determined by measuring the filtration performance with and without an imparted charge. For example the filtration performance of a charged, microfibrillated article may be measured, then the microfibrillated article subjected to a discharging procedure and the performance again measured. A decrease in performance is indicative of an imparted charge. Suitable discharging procedures include exposure to x-ray radiation, or exposure to alcohols such as isopropanol. Alternatively the discharged microfibers may be re-charged by corona treatment and the results compared. As an alternative, the charge on the microfibers (or microfibrillated article) may be directly measured by thermally stimulated discharge as described herein.

For charged microfibers, preferred polymers include polypropylene and poly(4-methyl-1-pentene), blends thereof or copolymers formed from at least one of polypropylene and poly(4-methyl-1-pentene). The polymer should be substantially free of materials or adjuvants, such as antistatic agents, which increase the electrical conductive or otherwise interfere with the ability of the fibers to accept and retain an electrical charge.

The molecular weight of the polymer should be chosen so that the polymer is melt processible under the processing conditions. For polypropylene and polyethylene, for example, the molecular weight may be from about 5000 to 499,000 and is preferably from about 100,000 to 300,000.

Microvoided films are described in U.S. Pat. No. 6,110,588, the entire disclosure of which is incorporated by reference. Microvoided films are derived from a highly oriented, semicrystalline, melt processed film having an induced crystallinity. Induced crystallinity is the maximized crystallinity that may be obtained by an optimal combination of casting and subsequent processing such as calendering, annealing, stretching and recrystallization. For polypropylene, for example, crystallinity is above 60%, preferably above 70%, most preferably above 75%. The crystallinity may be measured by differential scanning calorimetry (DSC) and comparison with extrapolated values for 100% crystalline polymers. For example, see B. Wunderlich, Thermal Analysis, Academic Press, Boston, Mass., 1990.

Generally, the crystallinity of commercially available cast films must be increased to be useful in the process of the invention. Cast films, such as those prepared by extrusion from a melt followed by quenching on a cooled casting drum, exhibit a "spontaneous crystallinity" that results from conventional processing conditions. For example, isotactic polypropylene cast films typically exhibit crystallinity of 59–61% by DSC analysis. When using such polypropylene film in the process of the invention, it is desirable to increase the crystallinity at least 20% above this "spontaneous crystallinity" value, to about 72% or higher. It is believed that maximizing the crystallinity of the film will increase microfibrillation efficiency.

Any suitable combination of processing conditions may be used to impart the maximum induced crystallinity and orientation to the melt-processed film. These may include any combination of casting, quenching, annealing, calendering, orienting, solid-state drawing, roll-trusion and the like. Such processing generally also serves to increase the degree of crystallinity of the polymer film as well as the size and number of the spherulites. The suitability of a film for subsequent process steps may be determined by measuring degree of crystallinity of the polymer film by, for example, x-ray diffraction or by differential scanning calorimetry (DSC).

Highly oriented polymer, films, suitable for subsequent processing to impart a microvoided morphology, are known and/or commercially available. These have been described for example by Nippon Oil, Tokyo; Polteco, Hayward, Calif.; Cady Industries Inc, Memphis Tenn.; and Signode Packaging Systems, Glenview Ill.

Microvoids are microscopic voids in the film, or on the surface of the film, which occur when the film is unable to conform to the deformation process imposed. By "unable to conform" it is meant that the film is unable to sufficiently relax to reduce the stress caused by the imposed strain. The highly oriented highly crystalline polymer films are stretched under conditions of plastic flow that exceed the ability of the polymer to conform to the imposed strain, thereby imparting a microvoided morphology thereto. In conventional film orientation processes, such excessive stresses are avoided since they lead to weaknesses in the film and may result in breakage during orientation. During an orientation process step of the present invention there occur small breakages or tears (microvoids) when the deformation stress due to orientation exceeds the rate of disentangling of the polymer molecules. See, for example, Roger S. Porter and Li-Hui Wang, Journal of Macromolecular Science-Rev. Macromol. Chem. Phys., C35(1), 63–115 (1995).

Depending on how the film is processed to induce crystallinity and how the film is oriented, one or both surfaces may have significant microvoid content, in addition to significant microvoid content in the bulk of the film. When orienting the film by stretching in the machine direction, microvoids are typically distributed throughout the x, y and z axes of the film, generally following the fibril boundaries, and appearing as microscopic defects or cracks.

Microvoids are relatively planar in shape, irregular in size and lack distinct boundaries. Microvoids at the surface of the film are generally transverse to the machine direction (direction of orientation) of the film, while those in the matrix of the film are generally in the plane of the film, or perpendicular to the plane of the film with major axes in the machine direction (direction of orientation). Microvoid size, distribution and amount in the film matrix may be determined by techniques such as small angle x-ray scattering (SAXS), confocal microscopy or density measurement. Additionally, visual inspection of a film may reveal enhanced opacity or a silvery appearance due to significant microvoid content.

Generally, the greater the microvoid content, the greater the yield of microfibers by the process of this invention. Preferably, when preparing an article having at least one microfibrillated surface, at least one major surface of the polymer film should have a microvoid content in excess of 5%, preferably in excess of 10%, as measured by density; i.e., the ratio of the density of the microvoided film with that of the starting film. Microvoided films useful in the present invention may be distinguished from other voided films or articles, such as microporous films or foamed articles in that the microvoids are generally non-cellular, relatively planar and have major axes in the machine direction (direction of orientation) of the film. The microvoids do not generally interconnect, but adjacent microvoids may intersect.

In practice, the films first may be subjected to one or more processing steps to impart the desired degree of crystallinity and orientation, and further processed to impart the microvoids, or the microvoids may be imparted coincident with the process step(s) which impart crystallinity. Thus the same calendering or stretching steps that orient the polymer film and enhance the crystallinity (and orientation) of the polymer may concurrently impart microvoids.

In one embodiment of the present invention, the polymer is extruded from the melt through a die in the form of a film or sheet and quenched to maximize the crystallinity of the film by retarding or minimizing the rate of cooling. As the polymer cools from the melt, it begins to crystallize and spherulites form from the developing crystallites. If cooled rapidly from a temperature above its melting point to a temperature well below the crystallization temperature, a structure is produced comprising crystallites surrounded by large amorphous regions, and the size of the spherulites is minimized.

In one embodiment, the film is quenched on a heated casting drum that is maintained at a temperature above the glass transition temperature, but below the melt temperature. Normally, polypropylene, for example, is cold quenched at about 24° C. (750° F.), but in the present process, for example, a hot quench from a melt at about 220° C. (450° F.) to a quench temperature of 82° C.(180° F.), preferably above 100° C. This higher quenching temperature allows the film to cool slowly and the crystallinity of the film to increase due to annealing. Preferably quenching occurs at a rate to not only maximize the crystallinity, but to maximize the size of the crystalline spherulites.

The effect of casting temperature and cooling rate on the crystallinity is known and reference may be made to S. Piccarolo et al., Journal of Applied Polymer Science, vol. 46, 625–634 (1992).

Alternatively to casting on a heated casting drum, the film may be quenched in air or in a fluid such as water, which may be heated, to allow the film to cool more slowly and allow the crystallinity and spherulite size to be maximized. Air or water quenching may ensure the uniformity of the crystallinity and spherulite content across the thickness of the film. Depending on the thickness of the extruded article and the temperature of the casting drum, the morphology of the polymer may not be the same across the thickness of the article, i.e., the morphology of the two surfaces may be different. The surface in contact with the heated casting drum may be substantially crystalline, while the surface remote from the casting drum may have similar morphology due to exposure to the ambient air where heat transfer is less efficient. Small differences in morphology do not normally prevent the formation of a microfibrillated surface on either major surface on the film, but if microfibrillated surfaces are desired on both surfaces of the article, it is preferred that the temperature of the casting wheel be carefully controlled to ensure uniform crystallinity across the thickness of the article.

Alternatively to casting on a heated casting wheel, the film may be rapidly quenched to a temperature below the crystallization temperature and the crystallinity increased by stress induced crystallization; for example, by drawing at a draw ratio of at least 2:1. The drawing tension should be sufficient to produce alignment of the molecules and deformation of the spherulites by inducing the required plastic deformation above that produced by flow drawing.

After casting (and drawing, if any), the polymer may be characterized by a relatively high crystallinity and significant spherulite formation. The size and number of the spherulties is dependent of the casting conditions. The degree of crystallinity and presence of spherulite structures may be verified by, for example, x-ray diffraction and electron microscopy.

The thickness of the film will be chosen according to the desired end use and can be achieved by control of the process conditions. Cast films will typically have thicknesses of less than 100 mils (2.5 mm), and preferably between 30 and 70 mils (0.8 to 1.8 mm). However, depending on the characteristics desired for the resultant article, they may be cast at thicknesses outside of this range.

In a preferred embodiment the cast film is calendered after quenching. Calendering allows higher molecular orientation to be achieved by enabling subsequent higher draw ratios. In the absence of a calendering step, subsequent draw ratios in the orienting step above the natural draw ratio (7:1 for polypropylene) are generally not achievable without risking breakage. Calendering at the appropriate temperature can reduce the average crystallite size through shearing and cleaving of the entanglements, and may impose an aspect ratio on the spherulites (i.e. flatten in the transverse direction and elongate in the machine direction). Calendering is preferably performed at or above the alpha crystallization temperature. The alpha crystallization temperature, Tαc, corresponds to the temperature at which crystallite subunits are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure. The calendering step has the effect of orienting the fibrils into the plane of the film from the original radially oriented sphere. The crystallites are cleaved due to the shear forces, which may be verified by wide-angle x-ray. Thus the individual fibrils are largely radial from the nucleating site, but lie in the same plane.

After calendering, the article is then oriented in the machine direction by stretching under conditions of plastic flow, that are insufficient to cause catastrophic failure of the film, (i.e., in excess of the ability of the polymer to conform to the strain). Using polypropylene, for example the films may be stretched at least 5 times its length. In a preferred embodiment, when considering both the calendering and orienting steps, the combined draw ratio is at least 10:1 and preferably in the range of 10:1 to about 40:1 for polypropylene.

The orientation (stretching) step is preferably done immediately after the calendering step, i.e., the calendered film is fed directly from the calender nip to the length orienting equipment. A minimum gap between the calender nip to the first length-orienting roller minimizes cooling and avoids creasing of the film. The tension of the length-orienting machine is maintained so that essentially no relaxation occurs during the orientation step and orientation imparted during calendering is maintained. Preferably the length orientation apparatus comprises a plurality of orientation rollers, whose relative speeds are controlled so as to impart a gradual draw or orientation to the film. Further the plurality of rollers may be temperature controlled to provide a gradual temperature decrease to the oriented film and thereby maximize the orientation.

The stretching conditions are chosen to impart microvoids (in excess of 5% as measured by the change in density) to the surface of the film. Generally the stretching conditions may be chosen such that, under plastic flow (at a given minimum temperature and maximum stretch ratio), the temperature is reduced about 10° C. or more, or the strain imposed is increased about 10% (stretched about 10% further) to induce microvoids. Also, the temperature may be decreased and the stretch ratio increased at the same time, as long as conditions are chosen so as to exceed the ability of the polymer to conform to the strain imposed and avoiding catastrophic failure of the film.

Microvoids are small defects that occur when the film is drawn at a tension, under conditions of plastic flow, exceeding that at which the film is able to conform to the stress imposed. Or at a speed that is faster than the relaxation rate of the film (the rate of detanglement of the polymer chains). The occurrence of a significant amount of microvoids will impart an opalescent or silvery appearance to the surface of the film due to light scattering from the defects. In contrast, film surfaces lacking significant microvoids have a transparent appearance. The presence of microvoids may be verified by small-angle x-ray or density measurement, or by microscopy. The appearance can serve as an empirical test of the suitability of an oriented film for the production of a microfibrillated surface. It has been found that an oriented film lacking in significant amount of microvoids is not readily microfibrillated, even though the film may be split longitudinally, as is characteristic of highly oriented polymer films having a fibrous morphology.

In the orienting step, the individual fibrils of the spherulites are drawn substantially parallel to the machine direction (direction of orientation) of the film and in the plane of the film. The calendered, oriented fibrils can be visualized as having a rope-like appearance. By confocal light microscopy, the microtomed film reveals a microfibrous morphology in which microvoids may be observed.

The final thickness of the film will be determined in part by the casting thickness, the calendering thickness and the degree of orientation. For most uses, the final thickness of the film prior to microfibrillation will be 1 to 20 mils (0.025 to 0.5 mm), preferably 3 to 10 mils (0.075 to 0.25 mm).

The charged microfibrillated article may also be prepared from voided, oriented films having a semicrystalline polymer component and a void-initiating component. Such oriented, voided films are described in Assignee's copending application U.S. Ser. No. 09/307,577, filed May 7, 1999, the entire disclosure of which is incorporated by reference.

When using the voided, oriented films, the semicrystalline polymer component comprises the non-conductive polymers previously described. The semicrystalline polymer component may further comprise small amounts of a second polymer to impart desired properties to the microfibrillated film of the invention. The second polymer of such blends may be semicrystalline or amorphous and is generally less than 30 weight percent, based of the weight of the semicrystalline polymer component. For example, small amounts of linear low-density polyethylene may be added to polypropylene, when used as the semicrystalline polymer component, to improve the softness and drapability of the microfibrillated film. Small amounts of other polymers may be added, for example, to enhance stiffness, crack resistance, Elmendorff tear strength, elongation, tensile strength and impact strength, as is known in the art.

The void-initiating component is chosen so as to be immiscible in the semicrystalline polymer component. It may be an organic or an inorganic solid having an average particle size of from about 0.1 to 10.0 microns and may be any shape including amorphous shapes, spindles, plates, diamonds, cubes, and spheres.

Useful inorganic solids useful as void initiating components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates or sulfates; kaolin, talc, carbon black and the like. Inorganic void initiating components are chosen so as to have little surface interaction, due to either chemical nature or physical shapes, when dispersed in the semicrystalline polymer component. In general the inorganic void initiating components should not be chemically reactive with the semicrystalline polymer component, including Lewis acid/base interactions, and have minimal van der Waals interactions. When a charged microfibrillated article is desired, a non-coductive continuous phase and a non-conductive inorganic void initiating component should be chosen, although conductive materials may be used if sufficiently dispersed.

Preferably the void initiating component comprises a thermoplastic polymer, including semicrystalline polymers and amorphous polymers, to provide a blend immiscible with the semicrystalline polymer component. An immiscible blend shows multiple amorphous phases as determined, for example, by the presence of multiple amorphous glass transition temperatures. As used herein, "immiscibility" refers to polymer blends with limited solubility and non-zero interfacial tension, i.e. a blend whose free energy of mixing is greater than zero:

$$\Delta G_m \cong \Delta H_m > 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, Flory-Huggins interaction parameter between two non-polar polymers is always a positive number.

Polymers useful as the void-initiating component include the above described semicrystalline polymers, as well as amorphous polymers, selected so as to form discrete phases upon cooling from the melt. Useful amorphous polymers include, but are not limited to, polystyrene, polymethymethacrylate, polycarbonate, cyclic olefin copolymers (COC's) such as ethylene norbornene copolymers, and toughening polymers such as styrene/butadiene rubber (SBR) and ethylene/propylene/diene rubber (EPDM). When a charged microfibrillated article is desired, a conductive or non-conductive void initiating component may be chosen, so long and the continuous phase is non-conductive.

Specific useful combinations of immiscible polymer blends include, for example, polypropylene and polybutylene terphthalate, polypropylene and polyethylene terphthalate, polypropylene and polystyrene, polypropylene and high density polyethylene, polypropylene and low density polyethylene, polypropylene and polycarbonate, polypropylene and polymethylpentene; and polypropylene and nylon.

When using an immiscible polymer blend, the relative amounts of the semicrystalline polymer component and void initiating polymer component can be chosen so the first polymer forms a continuous phase and the second polymer forms a discontinuous phase. Preferably, the semicrystalline polymer component forms the continuous phase while the void initiating component forms a discontinuous, or discrete phase, dispersed within the continuous phase of the first polymer. In such constructions, the amount of void initiating component will affect final film properties. In general, as the amount of the void initiating component increases, the amount of voiding in the final film also increases. As a result, properties that are affected by the amount of voiding in the film, such as mechanical properties, density, light transmission, etc., will depend upon the amount of added void initiating component. When the void initiating component is a polymer, as the amount of void initiating polymer in the blend is increased, a composition range will be reached at which the void initiating polymer can no longer be easily identified as the dispersed, or discrete, phase. Further increase in the amount of void initiating polymer in the blend will result in a phase inversion wherein the void initiating polymer becomes the continuous phase.

Preferably, whether the void initiating component is organic or inorganic, the amount of the void initiating component in the composition is from 1% by weight to 49% by weight, more preferably from 5% by weight to 40% by weight, most preferably from 10% by weight to 25% by weight. In these composition ranges, the first semicrystalline polymer forms a continuous phase, while the void initiating component forms the discrete, discontinuous phase.

Additionally, the selected void initiating component must be immiscible with the semicrystalline polymer component selected. In this context, immiscibility means that the discrete phase does not dissolve into the continuous phase in a substantial fashion, i.e., the discrete phase must form separate, identifiable domains within the matrix provided by the continuous phase.

The molecular weight of each polymer should be chosen so that the polymer is melt processable under the processing conditions. For polypropylene and polyethylene, for example, the molecular weight may be from about 5000 to 500,000 and is preferably from about 100,000 to 300,000.

In order to obtain the maximum physical properties and render the polymer film amenable to microfibrillation, the polymer chains need to be oriented along at least one major axis (uniaxial), and may further be oriented along two major axes (biaxial). The degree of molecular orientation is generally defined by the draw ratio, that is, the ratio of the final length to the original length. This orientation may be effected by a combination of techniques in the present invention, including the steps of calendering and length orienting.

In the present invention, a melt-processed film comprising an immiscible polymer mixture is provided. It is preferred that the crystallinity of the semicrystalline polymer component be increased by an optimal combination of casting and subsequent processing such as calendering, annealing, stretching and recrystallization. It is believed that maximizing the crystallinity of the film will increase microfibrillation efficiency.

Upon orientation, voids are imparted to the film. As the film is stretched, the two components separate due to the immiscibility of the two components and poor adhesion between the two phases. When the film comprise a continuous phase and a discontinuous phase, the discontinuous phase serves to initiate voids which remain as substantially discrete, discontinuous voids in the matrix of the continuous phase. When two continuous phases are present, the voids that form are substantially continuous throughout the polymer film. Typical voids have major dimensions X and Y, proportional to the degree of orientation in the machine and transverse direction respectively. A minor dimension Z, normal to the plane of the film, remains substantially the same as the cross-sectional dimension of the discrete phase (void initiating component) prior to orientation. Voids arise due to poor stress transfer between the phases of the immiscible blend. It is believed that low molecular attractive forces between the blend components are responsible for immiscible phase behavior; low interfacial tension results in void formation when the films are stressed by orientation or stretching.

Unexpectedly, it has been found that voids may be imparted to the two component (semicrystalline and void initiating) polymer films under condition far less severe than those necessary to impart voids to microvoided films previously described. It is believed that the immiscible blend, with limited solubility of the two phases and a free energy of mixing greater than zero, facilitates the formation of the voids necessary for subsequent microfibrillation.

The conditions for orientation are chosen such that the integrity of the film is maintained. Thus when stretching in the machine and/or transverse directions, the temperature is chosen such that substantial tearing or fragmentation of the continuous phase is avoided and film integrity is maintained. The film is particularly vulnerable to tearing or even catastrophic failure if the temperature is too low, or the orientation ratio(s) is/are excessively high. Preferably, the orientation temperature is above the glass transition temperature of the continuous phase. Such temperature conditions permit maximum orientation in the X and Y directions without loss of film integrity, maximize voiding imparted to the film and consequently maximizing the ease with which the surface(s) may be microfibrillated.

The voids are relatively planar in shape, irregular in size and lack distinct boundaries. Voids are generally coplanar witch the film, with major axes in the machine (X) and transverse (Y) directions (directions of orientation). The size of the voids is variable and proportional to the size of the discrete phase and degree of orientation. Films having relatively large domains of discrete phase and/or relatively high degrees of orientation will produce relatively large voids. Films having a high proportion of discrete phases will generally produce films having a relatively high void content on orientation. Void size, distribution and amount in the film matrix may be determined by techniques such as small angle x-ray scattering (SAXS), confocal microscopy, scanning electron microscopy (SEM) or density measurement. Additionally, visual inspection of a film may reveal enhanced opacity or a silvery appearance due to significant void content.

Generally, greater void content enhances the subsequent microfibrillation, and subsequently, using the process of this invention, for uniaxially oriented films, the greater the yield of fibers and for biaxially oriented films, the greater the yield of fibrous flakes. Preferably, when preparing an article having at least one microfibrillated surface, the polymer film should have a void content in excess of 5%, more preferably in excess of 10%, as measured by density; i.e., the ratio of the density of the voided film with that of the starting film.

In practice, the films first may be subjected to one or more processing steps to impart the desired degree of crystallinity to the semicrystalline polymer component, and further processed to impart the voids, or the voids may be imparted coincident with the process step(s) which impart crystallinity. Thus the same calendering or stretching steps that orient the polymer film and enhance the crystallinity (and orientation) of the polymer may concurrently impart voids.

In one embodiment of the present invention, the polymer is extruded from the melt through a die in the form of a film or sheet and quenched to maximize the crystallinity of the semicrystalline phase by retarding or minimizing the rate of cooling. As the semicrystalline phase cools from the melt, it begins to crystallize and spherulites form from the developing crystallites. If cooled rapidly from a temperature above its melting point to a temperature well below the crystallization temperature, a structure is produced comprising crystallites surrounded by large amorphbous regions, and the size of the spherulites is minimized.

To enhance the crystallinity, the film may be quenched on a heated casting drum that is maintained at a temperature above the glass transition temperature, but below the melt temperature. A higher quenching temperature allows the film to cool slowly and the crystallinity of the film to increase due to annealing. Preferably quenching occurs at a rate to not only maximize the crystallinity, but to maximize the size of the crystalline spherulites. Alternatively, the film may be quenched by feeding the extruded film through a nip of temperature-controlled rollers.

As an alternative, the film may be quenched in air or in a fluid such as water, which may be heated, to allow the film to cool more slowly and allow the crystallinity and spherulite size of the semicrystalline phase to be maximized. Air or water quenching may ensure the uniformity of the crystallinity and spherulite content across the thickness of the film.

Depending on the thickness of the extruded article, the temperature and the means by which the film is quenched, the morphology of the polymer may not be the same across the thickness of the article, i.e., the morphology of the two surfaces and/or the morphology of the surfaces and the matrix may be different. A surface in contact with the heated casting drum may be substantially crystalline, while the surface remote from the casting drum may have dissimilar morphology due to exposure to the ambient air where heat transfer is less efficient. Small differences in morphology do not normally prevent the formation of a microfibrillated surface on either major surface on the film, but if microfibrillated surfaces are desired on both surfaces of the article, it is preferred that the temperature of the casting drum be carefully controlled to ensure uniform crystallinity across the thickness of the article.

As another alternative, the film may be rapidly quenched to a temperature below the crystallization temperature and the crystallinity increased by stress induced crystallization; for example, by drawing at a draw ratio of at least 2:1. The drawing tension should be sufficient to produce alignment of the molecules and deformation of the spherulites by inducing the required plastic deformation above that produced by flow drawing.

The thickness of the film will be chosen according to the desired end use and can be achieved by control of the process conditions. Cast films will typically have thicknesses of less than 100 mils (2.5 mm), and preferably between 30 and 70 mils (0.8 to 1.8 mm). However, depending on the characteristics desired for the resultant article, they may be cast at thicknesses outside of this range. In the present invention, cast films and well as blown films may be used to produce the microfibrillated films of the invention. Further, the processes described herein can also be advantageously used on films that have been simultaneously biaxially stretched. Such stretching can be accomplished, for example, by the methods and apparatus disclosed in U.S. Pat. No. 4,330,499 (Aufsess et al.) and U.S. Pat. No. 4,595,738 (Hufnagel et al.), and more preferably by the methods and tenter apparatus disclosed in U.S. Pat. No. 4,675,582 (Hommes et al); U.S. Pat. No. 4,825,111 (Hommes et al.); U.S. Pat. No. 4,853,602 (Hommes et al.); U.S. Pat. No. 5,036,262 (Schonbach); U.S. Pat. No. 5,051,225 (Hommes et al.); and U.S. Pat. No. 5,072,493 (Hommes et al.), the disclosures of which are herein incorporated by reference.

For a film that is to be uniaxially oriented, it is preferred that the cast film is calendered after quenching. Calendering allows higher molecular orientation to be achieved by enabling subsequent higher draw ratios. In the absence of a calendering step, subsequent high draw ratios in the orienting step above the natural draw are generally not achievable without risking breakage. Calendering at the appropriate temperature can reduce the average crystallite size through shearing and cleaving of the entanglements, and may impose an aspect ratio on the spherulites (i.e. flatten in the transverse direction and elongate in the machine direction). It is preferred not to calender films that are to be subsequently biaxially oriented. Calendering is preferably performed at or above the alpha crystallization temperature.

In the orienting step, the film is stretched in the machine direction (X axis) and may be simultaneously or sequentially stretched in the transverse direction. When first stretched in the machine direction, the individual fibrils of the spherulites of the semicrystalline polymer are drawn substantially parallel to the machine direction (direction of orientation) of the film and in the plane of the film. The oriented fibrils can be visualized as having a rope-like appearance. Subsequent or further orientation of the film in the transverse direction results in reorientation of the fibrils, again in the plane of the film, with varying populations along the X, Y and intermediate axes, depending on the degree of orientation in the machine and transverse directions. The stretching conditions are chosen to impart voids (in excess of 5% as measured by the change in density) to the film.

The occurrence of a significant amount of voids will impart an translucent, opalescent or silvery appearance to the surface of the film due to light scattering from the defects. In contrast, film surfaces lacking significant voids have a transparent appearance. The presence of voids may be verified by small-angle x-ray or density measurement, or by microscopy. The appearance can serve as an empirical test of the suitability of an oriented film for the production of a microfibrillated surface. It has been found that an oriented film lacking in significant amount of voids is not readily microfibrillated, even though the film may be split longitudinally, as is characteristic of highly oriented polymer films having a fibrous morphology.

The quenched film may be biaxially oriented by stretching in mutually perpendicular directions at a temperature above the glass transition temperature of the semicrystalline polymer continuous phase. Generally, the film is stretched in one direction first and then in a second direction perpendicular to the first. However, stretching may be effected in both directions simultaneously if desired. In a typical process, the film is stretched first in the direction of extrusion over a set of rotating rollers or between two pairs of nip rollers and is then stretched in the direction transverse thereto by means of a tenter apparatus. Films may be stretched in each direction up to 2 to 10 times their original dimension in the direction of stretching.

The temperature of the first orientation (or stretching) affects film properties. Generally, the first orientation step is in the Machine direction. Orientation temperature control may be achieved by controlling the temperature of heated rolls or by controlling the addition of radiant energy, e.g., by infrared lamps, as is known in the art. A combination of temperature control methods may be utilized.

Too low an orientation temperature may result in a film with an uneven appearance. Increasing the first orientation temperature may reduce the uneven stretching, giving the stretched film a more uniform appearance. The first orientation temperature also affects the amount of voiding that occurs during orientation. In the temperature range in which voiding occurs, the lower the orientation temperature, generally the greater the amount of voiding that occurs during orientation. As the first orientation temperature is raised, the degree of voiding decreases to the point of elimination. Electron micrographs of samples show that at temperatures at which no voiding occurs, the discrete phases domains often deform during stretching. This is in contrast to highly voided oriented samples; electron micrographs of highly voided samples show that the discrete phase domains in general retain their approximately shape during orientation. A second orientation, or stretching, in a direction perpendicular to the first orientation may be desired. The temperature of such second orientation is generally similar to or higher than the temperature of the first orientation.

After the film has been stretched it may be further processed. For example, the film may be annealed or heat-set by subjecting the film to a temperature sufficient to further crystallize the semicrystalline polymer component while restraining the film against retraction in both directions of stretching.

The final thickness of the film will be determined in part by the casting thickness, the degree of orientation, and any additional processing such as calendering. For most uses, the final thickness of the film prior to microfibrillation will be 1to 20 mils (0.025 to 0.5 mm), preferably 3 to 10 mils (0.075 to 0.25 mm).

If the charged, microfibrillated article is derived from high melt strength polymer foams, reference may be made to Assignee's copending U.S. Ser. No. 09/602,978 filed Jun. 23, 2000, the entirety of which is incorporated by reference.

The high melt strength polypropylene useful in the present invention includes homo- and copolymers containing 50 weight percent or more propylene monomer units, preferably at least 70 weight percent, and has a melt strength in the range of 25 to 60 cN at 190° C. Melt strength may be conveniently measured using an extensional rheometer by extruding the polymer through a 2.1 mm diameter capillary having a length of 41.9 mm at 190° C. and at a rate of 0.030 cc/sec; the strand is then stretched at a constant rate while measuring the force. Preferably the melt strength of the polypropylene is in the range of 30 to 55 cN, as described in WO 99/615201.

The melt strength of linear or straight chain polymers, such as conventional isotactic polypropylene, decreases rapidly with temperature. In contrast, the melt strength of highly branched polypropylenes does not decrease rapidly with temperature. It is generally believed that the differences in melt strengths and extensional viscosity are attributable to the presence of long chain branching. Useful polypropylene resins are those that are branched or crosslinked. Such high melt strength polypropylenes may be prepared by methods generally known in the art. Reference may be made to U.S. Pat. No. 4,916,198 (Scheve et al) which describes a high melt strength polypropylene having a chain-hardening elongational viscosity prepared by irradiation of linear propylene in a controlled oxygen environment.

Other useful methods include those in which compounds are added to the molten polypropylene to introduce branching and/or crosslinking such as those methods described in U.S. Pat No. 4,714,716 (Park), WO 99/36466 (Moad, et al.) and WO 00/00520 (Borve et al.). High melt strength polypropylene may also be prepared by irradiation of the resin as described in U.S. Pat. No. 5,605,936 (Denicola et :al.). Still other useful methods include forming a bipolar molecular weight distribution as described in J. I. Raukola, *A New Technology To Manufacture Polypropylene Foam Sheet And Biaxially Oriented Foam Film*, VTT Publications 361, Technical Research Center of Finland, 1998 and in U.S. Pat. No. 4,940,736 (Alteepping and Nebe), incorporated herein by reference.

The foamable polypropylene may consist of propylene homopolymers or may comprise a copolymer having 50 wt % or more propylene monomer content. Further, the foamable polypropylene may comprise a mixture or blend of propylene homopolymers or copolymers with a homo- or copolymer other than propylene homo- or copolymers.

Particularly useful propylene copolymers are those of propylene and one or more non-propylenic monomers. Propylene copolymers include random, block, and graft copolymers of propylene and olefin monomers selected from the group consisting of $C_3$–$C_8$ α-olefins and $C_4$–$C_{10}$ dienes.

Propylene copolymers may also include terpolymers of propylene and α-olefins selected from the, group consisting of C3–C8 α-olefins, wherein the α-olefin content of such terpolymers is preferably less than 45 wt %. The C3–C8 α-olefins include 1-butene, isobutylene, 1-pentene, 3-methyl-1-butene, 1-hexene, 3,4-dimethyl-1-butene, 1-heptene, 3-methyl- 1hexene, and the like. Examples of $C_4$–$C_{10}$ dienes include 1,3-butadiene, 1,4-pentadiene, isoprene, 1,5-hexadiene, 2,3-dimethyl hexadiene and the like.

Other polymers that may be added to the high melt strength polypropylene in the foamable composition include high. medium, low and linear low density polyethylene, fluoropolymers, poly(1-butene), ethylene/acrylic acid copolymer, ethylene/vinyl acetate copolymer, ethylene/ propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/ propylene/diene copolymer (EPDM).

The present invention provides a process for preparing a charged, microfibrillated article comprising the step of microfibrillating an oriented, high melt strength polypropylene foam wherein said oriented foam is prepared by the steps of extruding a mixture comprising a high melt-strength polypropylene and a blowing agent to produce a foam, and orienting the extruded foam in at least one direction. Preferably the method comprises mixing at least one high melt strength polypropylene and at least one blowing agent in an apparatus having an exit shaping orifice at a temperature and pressure sufficient to form a melt mixture wherein the blowing agent is uniformly distributed throughout the polypropylene; reducing the temperature of the melt mixture at the exit of the apparatus to an exit temperature that no more than 30° C. above the melt temperature of the neat polypropylene while maintaining the melt mixture at a pressure sufficient to prevent foaming; passing the mixture through said exit shaping orifice and exposing the mixture to atmospheric pressure whereby, the blowing agent expands causing cell formation resulting in foam formation; orienting the foam; and microfibrillating the foam.

An extrusion process using a single-screw, twin-screw or tandem extrusion system may prepare the foams useful in the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a physical blowing agent, such as $CO_2$ is used, the neat polymer is initially maintained above the melting temperature. The physical blowing agent is injected (or otherwise mixed) with the molten polymer and the melt mixture is cooled in the extruder to an exit temperature that is less than 30° C. above the melting temp of the neat polymer ($T \leq T_m + 30°$ C.) while the pressure is maintained at or above 2000 psi (13.8 MPa). Under these conditions the melt mixture remains a single phase. As the melt mixture passes through the exit/shaping die the melt rapidly foams and expands, generating foams with small, uniform cell sizes. It has been found that, by adding a physical blowing agent, the polypropylene may be processed and foamed at temperatures considerably lower than otherwise might be required. The blowing agent plasticizes, i.e., lowers the $T_m$ of, the polymeric material. The lower temperature can allow the foam to cool and stabilize soon after it exits the die, thereby making it easier to arrest cell growth and coalescence while the cells are smaller and more uniform.

When a chemical blowing agent is used, the blowing agent is added to the neat polymer, mixed, heated to a temperature above the $T_m$ of the polypropylene to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single phase mixture is cooled to an exit temperature no more than 30° C. above the melting temperature of the neat polymer, while the pressure is maintained at or above 2000 psi, (13.8 Mpa) by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the exit temperature is no more than 30° C. above the $T_m$ of the neat polypropylene, the extensional viscosity of the polymer increases as the blowing agent comes out of the solution and the polypropylene rapidly crystallizes. These factors arrest the growth and coalescense of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Either a physical or chemical blowing agent may plasticize, i.e., lower the $T_m$ and $T_g$ of, the polymeric material. With the addition of a blowing agent, the melt mixture may be processed and foamed at temperatures considerably lower than otherwise might be required, and in some cases may be processed below the melting temperature of the neat polypropylene. The lower temperature can allow the foam to cool and stabilize (i.e., reach a point of sufficient solidification to arrest further cell growth) and produce smaller and more uniform cell sizes.

Physical blowing agents useful in the present invention may be any material that is a vapor at the temperature and pressure at which the foam exits the die. The physical blowing agent may be introduced, i.e., injected, into the polymeric material as a gas, a supercritical fluid, or liquid, preferably as a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Flammable blowing agents such as pentane, butane and other organic materials may be used, but non-flammable, non-toxic, non-ozone depleting blowing agents such as hydrofluorocarbons (HFC), hydrochlorofluorocarbons (HCFC), and fully- or partially fluorinated ethers are preferred because they are easier to use, e.g., fewer environmental and safety concerns. Suitable physical blowing agents include, e.g., carbon dioxide, nitrogen, water, $SF_6$, nitrous oxide, argon, helium, noble gases such as xenon, air (nitrogen and oxygen blend), and blends of these materials.

Chemical blowing agents are added to the polymer at a temperature below that of the decomposition temperature of the blowing agent, and are typically added to the polymer feed at room temperature prior to introduction to the extruder. The blowing agent is then mixed to distribute it throughout the polymer in undecomposed form, above the melt temperature of the polymer, but below the activation temperature of the chemical blowing agent. Once dispersed, the chemical blowing agent may be activated by heating the mixture to a temperature above the decomposition temperature of the agent. Decomposition of the blowing agent liberates gases, such as $N_2$, CO, $CO_2$ and/or $H_2O$, yet cell formation is restrained by the temperature and pressure of the system. Useful chemical blowing agents typically decompose at a temperature of 140° C. or above. As previously described the mixture is cooled to a temperature at or below $T_m+30°$ C. prior to exiting the die.

Examples of such materials include synthetic azo-, carbonate-, and hydrazide-based molecules, including azodicarbonamide, azodiisobutyronitrile, benzenesulfonylhydrazide, 4,4-oxybenzene sulfonyl-semicarbazide, p-toluene sulfonyl semi-carbazide, barium azodicarboxylate, N,N'-dimethyl-N,N'-dinitrosoterephthalamide and trihydrazino triazine. Specific examples of these materials are Celogen OT (4,4' oxybis (benzenesulfonylhydrazide), Hydrocerol BIF (preparations of carbonate compounds and polycarbonic acids), Celogen AZ (azodicarboxamide) and Celogen RA (p-toluenesulfonyl semicarbazide).

The amount of blowing agent incorporated into the foamable polymer mixture is chosen to yield a foam having a void content in excess of 10%, more preferably in excess of 20%, as measured by density reduction; i.e., [1–the ratio of the density of the foam to that of the neat polymer]×100. Generally, greater foam void content enhances the subsequent microfibrillation and subsequently, the greater the yield of the microfibrillated surface. The foam may then be oriented as previously described to produce an oriented, voided film (foam) that may further be microfibrillated.

The highly-oriented, highly crystalline film is then microfibrillated by imparting sufficient fluid energy to the surface to release the microfibers from the polymer matrix. Optionally, prior to microfibrillation, the film may be subjected to a macrofibrillation step by conventional mechanical means to produce macroscopic fibers from the highly oriented film. The conventional means of mechanical fibrillation uses a rotating drum or roller having cutting elements such as needles or teeth in contact with the moving film. The teeth may fully or partially penetrate the surface of the film to impart a macrofibrillated surface thereto. Other similar macrofibrillating treatments are known and include such mechanical actions as twisting, brushing (as with a porcupine roller), rubbing, for example with leather pads, and flexing. The fibers obtained by such conventional macrofibrillation processes are macroscopic in size, generally several hundreds of microns in cross section. Such macroscopic fibers are useful in a myriad of products such as particulate filters, as oil absorbing media, and as electrets.

The oriented film is microfibrillated by imparting sufficient fluid energy thereto to impart a microfibrillated surface, for example, by contacting at least one surface of the film with a high-pressure fluid. In a microfibrillation process, relatively greater amounts of energy are imparted to the film surface to release microfibers, relative to that of a conventional mechanical fibrillation process. Microfibers are several orders of magnitude smaller in diameter than the fibers obtained by mechanical means (such as with a porcupine roller) ranging in size from less than 0.01 microns to 20 microns. In the present invention, microfibers may be obtained (rising polypropylene for example) having a degree of crystallinity in excess of 75%, a tensile modulus in excess of one million psi (~7 GPa).

The microfibers thus obtained from uniaxially oriented films are rectangular in cross section, having a cross sectional aspect ratio (transverse width to thickness) ranging from of about 1.5:1 to about 20:1. Further, the sides of the rectangular shaped microfibers (prepared from uniaxially oriented films) are not smooth, but have a scalloped appearance in cross section. Atomic force microscopy reveals that the microfibers of the present invention are bundles of individual or unitary fibrils, which in aggregate form the rectangular or ribbon-shaped microfibers. Thus the surface area exceeds that which may be expected from rectangular shaped microfibers, and such surface enhances bonding in matrices such as concrete and thermoset plastics.

Further, it has been discovered that the microfibrillation imparts an electrostatic charge to the resulting microfibrillated article. Such charged, microfibrillated articles are particularly useful in filtration applications, such as in heating, ventilation and air conditioning systems, in respiratory filters, such as particle masks and in vacuum cleaner filters and room air cleaner and the like. The charged, microfibrillated articles are also particularly useful as absorbant articles such as oleophilic articles used for removing oils from water, or as wipes for removing dusts and other debris from surfaces. The small size of the microfibers allows wipes to intimately contact and remove debris from surfaces having microtextured surfaces.

One method of microfibrillating the surface of the film is by means of fluid jets. In this process one or more jets of a fine fluid stream impact the surface of the polymer film, which may be supported by a screen or moving belt, thereby releasing the microfibers from the polymer matrix. One or both surfaces of the film may be microfibrillated. The degree of microfibrillation is dependent on the exposure time of the film to the fluid jet, the pressure of the fluid jet, the cross-sectional area of the fluid jet, the fluid contact angle, the polymer properties and, to a lesser extent, the fluid temperature. Different types and sizes of screens can be used to support the film. It is preferred, when imparting a charge to the microfibrillated article, that any support, such as a screen or belt, be non-grounding and non-conductive so as to not dissipate, any electrostatic charge.

Any type of liquid or gaseous fluid may be used. Liquid fluids may include water or organic solvents such as ethanol or methanol. Suitable gases such as nitrogen, air or carbon dioxide may be used, as well as mixtures of liquids and gases. Any such fluid is preferably non-swelling (i.e., is not absorbed by the polymer matrix), which would reduce the orientation and degree of crystallinity of the microfibers. For imparting a charge during microfibrillation, the preferred fluid is water and is most preferably deionized or distilled water substantially free of any contaminants such as salts or minerals that could dissipate the electrostatic charge. The fluid temperature may be elevated, although suitable results may be obtained using ambient temperature fluids. The pressure of the fluid should be sufficient to impart some degree of microfibrillation to at least a portion of the film, and suitable conditions can vary widely depending on the fluid, the nature of the polymer, including the composition and morphology, configuration of the fluid jet, angle of impact and temperature. Generally, less severe conditions are needed to microfibrillated the voided films and voided foams when compared to the microvoided films.

Typically, the fluid is water at room temperature and at pressures of greater than 3400 kPa (500 psi), although lower pressure and longer exposure times may be used. Such fluid will generally impart a minimum of 5 watts or 10 W/cm$^2$ based on calculations assuming incompressibility of the fluid, a smooth surface and no losses due to friction.

The configuration of the fluid jets, i.e., the cross-sectional shape, may be nominally round, but other shapes may be employed as well. The jet or jets may comprise a slot which traverses a section or which traverses the width of the film. The jet(s) may be stationary, while the film is conveyed relative to the jet(s), the jet(s) may move relative to a stationary film, or both the film and jet may move relative to each other. For example, the film may be conveyed in the machine (longitudinal) direction by means of feed rollers while the jets move transverse to the web. Preferably, a plurality of jets is employed, while the film is conveyed through the microfibrillation chamber by means of rollers, while the film is supported by a screen or scrim, which allows the fluid to drain from the microfibrillated surface. The film may be microfibrillated in a single pass, or alternatively the film may be microfibrillated using multiple passes past the jets.

The jet(s) may be configured such that all or part of the film surface is microfibrillated. Alternatively, the jets may be configured so that only selected areas of the film are microfibrillated. Certain areas of the film may also be masked, using conventional masking agents to leave selected areas free from microfibrillation. Likewise the process may be conducted so that the microfibrillated surface penetrates only partially, or fully through the thickness of the starting film. If it is desired that the microfibrillated surface extend through the thickness of the film, conditions may be selected so that the integrity of the article is maintained and the film is not severed into individual yarns or fibers. A screen or mesh may be used to impart a pattern to the surface of the microfibrillated article.

A hydroentangling machine, for example, can be employed to microfibrillate one or both surfaces by exposing the fibrous material to the fluid jets. Hydroentangling machines are generally used to enhance the bulkiness of microfibers or yarns by using high-velocity water jets to wrap or knot individual microfibers in a web bonding process, also referred to as jet lacing or spunlacing. Alternatively a pressure water jet, with a swirling or oscillating head, may be used, which allows manual control of the impingement of the fluid jet.

In the present process the degree of microfibrillation can be controlled to provide a low degree or high degree of microfibrillation. A low degree of microfibrillation may be desired to enhance the surface area by partially exposing a minimum amount of microfibers (or microfibrous flakes) at the surface, and thereby imparting a fibrous texture to the surface of the film. The enhanced surface area consequently enhances the bondability of the surface. Such articles are useful, for example as substrates for abrasive coatings and as receptive surfaces for printing, as hook and loop fasteners, as interlayer adhesives and as tape backings. Conversely, a high degree of microfibrillation may be required to impart a highly fibrous texture to the surface to provide cloth-like films, insulating articles, filter articles or to provide for the subsequent harvesting of individual microfibers (i.e., removal of the microfibers or microfibrous flakes) from the polymer matrix.

In either microfibrillation process most of the microfibers (or microfibrous flakes) stay attached to the web due to incomplete release from the polymer matrix. Advantageously the microfibrillated article, having microfibers (or microfibrous flakes) secured to a web, provides a convenient and safe means of handling, storing and transporting the microfibers. For many applications it is desirable to retain the microfibers secured to the web. Further, the integral microfibers may be extremely useful in many filtering applications-the present microfibrillated article provides a large filtering surface area due to the microscopic size of the microfibers while the non-fibrillated surface of the film may serve as an integral support.

Optionally the microfibers may be harvested from the surface of the film by mechanical means such as with a porcupine roll, scraping and the like. Harvested microfibers generally retain their bulkiness (loft) due to the high modulus of the individual microfibers and, as such, are useful in many thermal insulation applications such as clothing. If necessary, loft may be improved by conventional means, such as those used to enhance the loft of blown microfibers, for example by the addition of staple fibers.

It has also been discovered that oriented, thin films may be readily fibrillated to produce charged fibers. The degree or orientation necessary is less than that required to impart voids or microvoids to the film. Such microfibrillatable films are generally less than about 50 microns in thickness, have a draw ratio of at least 5:1 for uniaxially oriented films, and produce charged fibers that larger than those previously described; typically 50 to 200 microns in average effective diameter. The fibers, however, are substantially rectangular in cross section, having a transverse aspect ratio of 1.5:1 to 20:1.

The performance of the charged microfibers (and articles made therefrom) may be enhanced by the addition of charge additives to the polymer melt. Charge additives may be added to the polymer(s) used in preparation of the microvoided films, the voided films, the thin films or the voided foams. The use of charge additives generally allows a greater charge to be imparted and/or improve the charge stability. Useful charge additives include triphenylmethanes such as those described in U.S. Pat. No. 5,015,767, ammonium and immonium compounds such as those described in U.S. Pat. No. 5,015,676, fluorinated ammonium and immonium compounds such as those described in U.S. Pat. No. 5,069,994, phosphonium compounds such as those described in U.S. Pat. No. 5,021,473, fluorinated phosphonium compounds such as those described in U.S. Pat. Nos. 5,147,748 and 5,908,598, triazine compounds such as those described in U.S. Pat. No. 5,908,598, each of which are incorporated by reference.

Other useful charge additives include those described by Jones et al., U.S. Pat. No. 5,472,481 and Rousseau et al., U.S. Pat. Nos. 5,908,598, 5,919,847, 5,968,635 and 5,976,208, the substance of which are incorporated herein by reference in their entirety. The charge additives include fluorochemical additives, namely a thermally stable organic compound or oligomer containing at least one perfluorinated moiety, such as fluorochemical piperazines, stearate esters of perfluoroalcohols, and/or thermally stable organic triazine compounds or oligomers containing at least one nitrogen atom in addition to those of the triazine group, or a fluorochemical oxazolidinone.

The charge additive is preferably a hindered or aromatic amine compound; most preferably a compound containing a hindered amine such as those derived from tetramethylpiperidine rings,

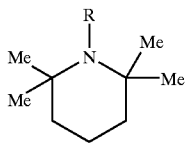

where R is hydrogen or an alkyl group. Preferably the hindered amine is associated with a triazine group as described in Rousseau et al.,(supra). Alternatively, nitrogen or metal containing hindered phenol charge enhancers could be used such as disclosed in U.S. Pat. No. 5,057,710, the substance of which is incorporated by reference in its entirety.

The charge additives used in the present invention are generally homogeneously incorporated into the semicrystalline polymer in a concentration of 0.01 to 5 weight percent, relative to the amount of the polymer. The charge additives can be added to the polymer as dried and ground powders, dispersions or solutions, press-cakes, or in a master batch, or adsorbed onto the surface of a suitable carrier, such as a void-initiating particle.

If desired, adjuvants may be added to the polymer melt to improve the microfibrillation efficiency, such as silica, calcium carbonate or micaceous materials or to impart a desired property to the microfibers, such as antistats or colorants. If however, a charged microfibrillated article is desired, any adjuvant must be non-conductive and not interfere with the imparted charge.

Further, nucleating agents may be added to control the degree of crystallinity or, when using polypropylene, to increase the proportion of β-phase polypropylene in the crystalline film. A high proportion of β-phase is believed to render the crystalline film more readily microfibrillated. β-phase nucleating agents are known and are described, for example, in Jones, et al., Makromol. Chem., vol. 75, 134–158 (1964) and J. Karger-Kocsis, Polypropylene: Structure, Blends and Composites, vol. 1, 130–131 (1994). One such beta nucleating agent is N',N',-dicyclohexyl-2,,6-napthalene dicarboxamide, available as NJ-Star NU- 100™ from New Japan Chemical Co. Chuo-ku, Osaka. Japan.

The present invention provides milcrofibrous flakes, and microfibers with a very small effective average diameter (average, width: and thickness), generally less than 20 μm) from fibrous polymeric materials. The small diameter of the microfibers provides advantages in many applications where efficiency or performance is improved by small fiber diameter. For example, the surface area of the microfibers (or the microfibrillated film) is inversely proportional to fiber diameter allowing for the preparation of more efficient filters. The high surface area also enhances the performance when used as adsorbents, such as in oil-absorbent mats or batts used in the clean up of oil spills and slicks. Such performance advantages are enhanced when using charged microfibers, fibers and microfibrillated articles of the present invention.

The present invention provides a wipe comprising the microfibers (or microfibrous flakes) of the present invention. The article may comprise a microfibrillated article (i.e. a film having a microfibrillated surface) or a fibrillated article derived from a thin, oriented, non-conductive film. The surface of the microfibrillated article may comprise the microfibers (from a uniaxially oriented film or foam) or microfibrous flakes (from a biaxially oriented film or foam), or fibers (from a thin, oriented, non-conductive film). The microfibrillated article is particularly useful, because the microfibers (or microfibrous flakes) are integral to the film. The charge helps attract and retain dust particles and other debris.

The wipe (or wiping article) may also be prepared from the microfibers harvested from the microfibrillated article. Such fibers may be used for example, in a non-woven construction using techniques known to the art. Such a non-woven construction may further include stable fibers.

The wipe may further comprise a support. In dusting applications, for example, it is desirable to provide a wiping article that has at least one portion capable of picking up finer dust particles and at least one portion providing a means for grasping or holding the article and preferably also providing a second cleaning function such as picking up larger dirt particles, for example. Most preferably, it is desirable to provide an article capable of performing the foregoing cleaning applications without added chemicals. It is desirable to provide such a cleaning article in a variety of forms suited to particular cleaning applications such as dusting and wiping applications as well as personal care applications and the like.

The support may be formed from any of a variety of materials capable of supporting the cloth layer and providing a means to grasp the article during a cleaning application (e.g,, dusting). Included as possible support materials are lofty, three dimensional, nonwoven webs, foamed polymers, such as foamed polyurethane, sponges and the like. In cleaning applications, the microfiber layer (i.e. the layer comprising microfibers or microfibrous flakes) and the support can perform separate cleaning functions. The wipe can therefore comprise a microfibrous surface and a support layer bonded or otherwise affixed thereto.

When used as a filtration media, the microfibrillated article may be used in complex shapes, such as pleats. Pleated structures may be prepared by standard pleating methods and equipment. The filtration media may be used alone or may be laminated to further functional layers by adhesives, heat bonding, ultrasonics and the like. The further functional layers can be prefilter layers for, large diameter particles, support layers such as scrims, spunbond, spunlace, melt blown, air-laid nonwoven, wet laid nonwoven, or glass fiber webs, netting such as Delnet, metal mesh or the like; absorbant filter media, or protective cover layers. Multiple layers of the filter media may be laminated together to provide improved performance.

The fibrous electret filter produced by the method of the present invention is especially useful as an air filter element of a respirator such as face mask or for such purposes as home and industrial air-conditioners, air cleaners, vacuum cleaners, medical air line filters, and air conditioning systems for vehicles and common equipment such as computers, computer disk drives and electronic equipment. In respirator uses, the charged filters may be in the form of molded or folded half-face mask, replaceable cartridges or canisters, or prefilters. In such uses, an air filter element produced by the method of invention is surprisingly effective for removing particulate aerosols.

If desired, the microfibrillated article (including the filter media and wipes) may have a pattern embossed on the surface thereof. The embossed pattern may be merely decorative, or may provide structural integrity to the article. The surface may be embossed to a degree to improve the handleability, or integrity, but not substantially interfere with the ability to gather dust (for wipes) or filtration performance. The embossments may be continuous, define individual, separated geometric shapes such as squares or circles, or may be a pattern of discontinuous straight or curved lines. Generally, the degree of embossing is less than 40% of the working area of the article, and preferably less than 10%.

Any of a wide variety of embossing methods known to the art may be used to provide the embossments. For example, conventional heat and pressure may be used. Other useful methods include impulse sealing with pressure in which the web is rapidly heated and cooled under pressure, thereby minimizing any undesirable heat transfer, ultrasonic welding with pressure, rotary pressure embossing under ambient conditions, i.e. without heating. It is desirable to minimize heat transfer to avoid charge degradation.

EXAMPLES

Test Method I—Penetration and Pressure Drop Test

The penetration and pressure drop test was performed by forcing sodium chloride particles (0.075+/−0.02 μm count median diameter), moving at a rate of 50 liters/minute (L/min.), through a sample of the microfibrillated article dimensioned to a diameter of 11.45 cm. The face velocity on the sample was 8.12 cm/second, and the sodium chloride particles were at a concentration of about 12.3 mg/m³. The samples were exposed to the aerosol of sodium chloride particles for 30 seconds. The percent particle penetration through the sample was measured using a Model TSI8110 Automated Filter Tester (available from TSI, St. Paul, Minn.). The pressure drop ΔP across the sample was measured using an electronic manometer and was reported in millimeters of water. The quality factor (Q) can be calculated from percent particle penetration (% Pen) and ΔP as follows:

$$Q[1/mmH_2O] = -Ln[(\% \, Pen/100)]/\Delta P(mmH_2O)$$

Test Method IIa—Dusting Performance Test

Dusting performance was measured by placing 1 gram of sand (90–175 μm mean diameter) on the finished surface of a piece of formica. The initial weight of a test sample of the microfibrillated article was determined, and then the test sample was attached to the bottom of a flat mop. The test sample was pushed over the sand with minimal pressure applied to the handle of the mop. The test sample was then removed and its final weight measured. Percent dust picked up was calculated as follows:

% Dust Picked Up=(final weight of sample−initial weight of sample)/initial weight of sand.

Test Method IIb—Dusting Performance Test

Dusting performance was measured by placing 200 milligrams of dust (0–100 μm mean diameter) on the finished surface of a piece of formica. The initial weight of a test sample of nonwoven was determined, and then the test sample was attached to the bottom of a flat mop. The test sample was pushed, over the dust with minimal pressure applied to the handle of the mop. The test sample was then removed and its final weight measured. Percent dust picked up was calculated as follows:

% Dust Picked Up=(final weight of sample−initial weight of sample)/initial weight of dust.

Test Method IIc—Dusting Performance Test

Dusting performance was measured by placing 100 milligrams of dust (0–125 μm mean diameter) on the finished surface of a piece of formica. The initial weight of a test sample of nonwoven was determined and then the sample was wiped over the dust by hand with minimal pressure applied to the nonwoven. The test sample was then removed and its final weight measured. Percent dust picked up was calculated as follows:

% Dust Picked Up=(final weight of sample−initial weight of sample)/initial weight of dust Test Method III—Charge Density Test The thermal stability of charge stored in the microfibrillated article was measured using a SOLOMAT TSC/RMA Model 61000 (available from Thermold Partners, Stamford, Conn.) for thermally stimulated current and relaxation map analysis. The sample was secured between two electrodes and poled by applying a DC field, E, of 1.5 kV/mm at 100° C. for 5 minutes in a helium atmosphere. Following poling, dipole orientation was locked in by quickly quenching to −50° C. at which point the electric field was removed. Then the sample was heated to 175° C. at 3° C./minute, and the discharge current was recorded as a function of temperature. By integrating the current versus temperature plot and then dividing the result by the sample probe surface area (0.38 cm²), an effective charge density was obtained. During poling, the polar molecular groups from chemical additives or other impurities in the sample will also be polarized and contribute to the total polarization subsequently measured by the thermally stimulated discharge current (TSDC) method. Therefore, samples discharged in solvent were also poled under the same conditions and tested for comparison purposes.

Samples were discharged by soaking in the named solvent for 15 minutes and then vacuum dried (20 inches Hg vacuum) at 60° C. for 1 hour to prevent changes in material morphology. The total charge and effective charge density of samples by TSDC analysis was reported from 0–140° C. to eliminate sample readings within the melt region. By integrating the current versus temperature plot, an effective charge density was obtained.

Example 1 and Comparative Example C1

A blown film of isotactic polypropylene with a thickness of about 45 μm and a width of about 25 cm was monoaxially stretched as described in U.S. Pat. No. Re. 30,782. Thus, the film was stretched to a ratio of 1:6 over a heated block, the temperature of which was 110° C. In a second stage, stretching was implemented over a heated plate at a temperature of 130° C. and at a stretching ratio of 1:1.5. The transport velocity was 12.2 m/min.

The monoaxially stretched film was microfibrillated by fluid jet using a Model 2303 Honeycomb Systems (Honeycomb systems Inc., Bridgeport, Me.) hydroentangling machine, equipped with a 61 cm die having 0.13 mm diameter holes spaced 0.39 mm apart (pitch), and using deionized water (23° C.) at la pressure of 13.79 MPa. The monoaxially stretched film was placed between two layers of spunbond polypropylene (15 g/m², available from Avgol Ltd., Holon, Israel), and the resulting three-layer material was covered on one major surface with an open mesh screen and placed on a continuous mesh screen with the opposite major surface of the three-layer material contacting the continuous mesh screen. The three-layer material was then passed at a rate of between 0.9 and 1.3 m/min. under the die at a distance of approximately 3 cm from the die, with the die positioned with its 61 cm axis perpendicular to the transport direction of the three-layer material. This sample was made using 2 passes under the fluid jets at 13.79 MPa. The fluid jets, which emanated from the 0.13 mm diameter holes, microfibrillated the film and entangled the microfibrillated film with spunbond polypropylene fibers, forming a cohesive nonwoven. The spunbond added cross-web strength to the microfibrillated material and facilitated its removal from the carrier screen. Samples of the resulting nonwoven were tested according to Test Method I—Penetration and Pressure Drop Test. Results are shown in Table 1. For comparison, additional samples of the nonwoven were separately treated with X-rays and then tested according to Test Method I. Treatment with X-rays is a known method for removing the charge from nonwovens. Results are also shown in Table 1.

Samples were irradiated with an Baltograph IV X-ray machine from, Balteau Electric Corporation, Stamford, Conn., which has a beryllium window (8 mA, 80 kVp) was used to irradiate the filter webs. The filter web sample was placed at a distance of 30 cm from the source and exposed to x-ray radiation for 5 minutes. The total x-ray exposure for each sample was about 2400 Roentgens.

TABLE 1

Results of Penetration and Pressure Drop Testing of Microfibrillated Polypropylene Between Layers of Spunbond Polypropylene

| Example | ΔP (mm Water) | % Pen |
|---|---|---|
| 1 | 0.1 | 60 |
| C1 | 0.1 | 98 |

The results in Table 1 show that the microfibrillated web, obtained directly from the fluid jet processing, was charged and was effective in filtering particles.

Example 2 and Comparative Example C2

Samples of the nonwoven from Example 1 were tested according to Test Method IIa—Dusting Performance Test, and the results are shown in Table 2. For comparison, additional samples of the nonwoven were treated with ethanol and then tested according to Test Method IIa. Treatment with ethanol is another known method for removing charge from a material, and was done by soaking the sample in ethanol for 15 minutes followed by air drying. The results are shown in Table 2.

TABLE 2

Results of Dust Performance Testing of Microfibrillated Polypropylene Between Layers of Spunbond Polypropylene

| Example | % Dust Picked Up |
|---|---|
| 2 | 80 |
| C2 | 30 |

The results in Table 2 show that the microfibrillated web, obtained directly from the fluid jet processing, was charged and was very effective in picking up dust particles.

Example 3 and Comparative Example C3

Polypropylene film was prepared by extruding polypropylene homopolymer (FINA 3374 available from Fina Inc., Dallas, Tex.) at 40 rpm with an extruder temperature profile of 229° C.–239° C.–247° C.–246° C. from feed to tip. The neck tube and die were maintained at 230° C. Films having a thickness of 1.7 mm, a width of 11.2 cm, and a density of 0.9000 g/mL were prepared by feeding the die output through a three-roll stack of cast rolls. The die output first entered the nip between the bottom and middle rolls held at 71.1° C. and then passed between the middle and top rolls, with the silicone rubber covered top roll held at 7.2° C.

The resulting cast films were calendered and oriented using a two-roll calender (set at a temperature of 149° C., a gap of 0.20 mm a pressure of 2.8 MPa, and a speed of 1.22 m/min.) and two sets of two-roll pulling calenders (set at a speed of 4.27 m/min.). The cast film was fed into the two-roll calender at approximately 0.24 m/min. The resulting highly oriented, microvoided film had a thickness of 0.15 mm, a width of 7.87 cm, a density of 0.8244 g/mL, a calculated void content of 8.4%, and a calculated extention ratio of 17.71. Calculated void content and calculated extention ratio were determined as follows:

$$\text{Calculated Void content} = \{1-(\text{initial density}/\text{final density})\} \times 100$$

$$\text{Calculated Extention Ratio} = \text{Final length}/\text{Initial length} = (\text{Initial Width} \times \text{Initial Thickness} \times \text{Initial Density})/(\text{Final Width} \times \text{Final Thickness} \times \text{Final Density})$$

The highly oriented, microvoided film was microfibrillated by fluid jet using a Model 2303 Honeycomb Systems (Honeycomb systems Inc., Bridgeport, Me.) hydroentangling machine, equipped with a 61 cm die having 0.13 mm diameter holes spaced 0.39 mm apart (pitch), and using deionized water (23° C.) at pressures of 11.0 to 13.8 MPa. The highly oriented, microvoided film was supported on a continuous mesh screen and passed two times using a pressure of 11.0 MPa and four times per side using a pressure of 13.8 MPa, at between 0.9 and 1.3 m/min, under the hydroentangler jets at a distance of approximately 3 cm from the die. The resulting microfibrillated film was taken up on a take-up roll.

Samples of the resulting microfibrillated film were tested according to Test Method I—Penetration and Pressure Drop Test. Results are shown in Table 3. For comparison, additional samples of the microfibrillated film were separately treated with X-rays and then tested according to Test Method I. Results of this test are also shown in Table 3.

Samples of the microfibrillated film were also tested according to Test Method III—Charge Density Test. For comparison, separate samples of the microfibrillated film were discharged by soaking in ethanol and then tested according to Test Method III. The results are shown in Table 4.

TABLE 3

Results of Penetration and Pressure Drop Testing of Microfibrillated Film

| Example | With/Without X-ray Discharge | ΔP (mm Water) | % Pen | Q |
|---|---|---|---|---|
| 3 | Without | 18.92 | 9.13 | 0.127 |
| C3 | With | 19.42 | 19.62 | 0.084 |

The results in Table 3 show that the microfilbrillated film, obtained directly from the fluid jet processing, was charged and was effective in filtering particles.

TABLE 4

Results of Charge Density Measurements by TSDC

| Example | With/Without Solvent Discharge | Ave. Charge Density (C/cm$^2$) |
|---|---|---|
| 3 | Without | 1.55 E-10 |
| C3 | With | 1.09 E-10 |

The results in Table 4 show that the microfibrillated film, obtained directly from the fluid jet processing, was charged. Charge density correlated to the filtration and dust pick up performance of these microfibrillated films.

Example 4 and Comparative Example C4

Cast films were prepared essentially as in Example 3, except that 1.0 weight % CHIMASSORB™944, a polymeric, multi-tertiary amine having a molecular weight greater than 2500 (available from Ciba Geigy Corp.), was used as an additive by dry-blending with the polypropylene prior to extrusion.

The resulting cast films having a thickness of 1.7 mm, a width of 11.2 cm, and a density of 0.9000 g/mL were calendered and oriented essentially as in Example 3, except a calender pressure of 2.1 MPa was used. The resulting highly oriented, microvoided film had a thickness of 0.15 mm, a width of 7.62 cm, a density of 0.7923 g/mL, a calculated void content of 12.0%, and a calculated extention ratio of 18.50.

The resulting highly oriented, microvoided film was microfibrillated as in Example 3, and the resulting microfibrillated film was tested as in Example 3 and Comparative Example 3. Test results are shown in Table 5.

Samples of the microfibrillated film were also tested according to Test Method III—Charge Density Test. For comparison, separate samples of the microfibrillated film were discharged by soaking in ethanol or n-heptane and then tested according to Test Method III. The results are shown in Table 6.

TABLE 5

Results of Penetration and Pressure Drop Testing of Microfibrillated Film with CHIMASSORB ™ 944

| Example | ΔP (mm Water) | % Pen | Q |
|---|---|---|---|
| 4 | 12.87 | 9.90 | 0.193 |
| C4 | 12.80 | 24.85 | 0.109 |

The results in Table 5 show that the microfibrillated film, obtained directly from the fluid jet processing, was charged and was effective in filtering particles. The results also show that the CHIMASSORB™944 increased the filtration effectiveness with a higher Quality Factor, Q as compared with the Q found with Example 3 material.

TABLE 6

Results of Charge Density Measurements by TSDC

| Example | With/Without Solvent Discharge | Ave. Charge Density (C/cm$^2$) |
|---|---|---|
| 3 | Without | 3.54 E-10 |
| C3 | With | 1.18 E-10 |

The results in Table 6 show that the microfibrillated film, obtained directly from the fluid jet processing, was charged. Charge density correlated to the filtration and dust pick up performance of these microfibrillated films.

Example 5 and Comparative Example C5

Cast films were prepared essentially as in Example 3, except that 0.01 weight % Hostaperm Red E3B (PV 19), a α-quinacridone and beta-nucleating agent (available from Clariant), was used as an additive by dry-blending with polypropylene and extruding to form a master batch and then extruding the master batch material along with polypropylene. The neck tube and die were maintained at 232° C. Films having a thickness of 1.68 mm, a width of 12.4 cm, and a density of 0.9000 g/mL were prepared by feeding the die output through a three-roll stack of cast rolls. The die output first entered the nip between the bottom and middle rolls held at 99° C. and then passed between the middle and top rolls, with the silicone rubber covered top roll held at 7.2° C.

The resulting cast films having a thickness of 1.68 mm, a width of 12.4 cm, and a density of 0.9000 g/mL were calendered and oriented, using a two-roll calender (set at temperatures of 146° C. and 149° C., a gap of 0.20 mm, a pressure of 3.45 MPa, and a speed of 1.22 m/min.) and two sets of two-roll pulling calenders (set at a speed of 5.03 m/min.). The cast film was fed into the two-roll calender at approximately 0.27 m/min. The resulting highly oriented, microvoided film had a thickness of 0.142 mm, a width of 8.13 cm, a density of 0.7335 g/mL, a calculated void content of 18.5%, and a calculated extention ratio of 22.23.

The resulting highly oriented, microvoided film was microfibrillated essentially as in Example 3 except two passes at a pressure of 11.0 MPa and two passes per side at a pressure of 13.8 MPa were used. The resulting microfibrillated film was tested as in Example 3 and Comparative Example 3. Test results are shown in Table 7.

TABLE 7

Results of Penetration and Pressure Drop Testing of Microfibrillated Film with Hostaperm Red E3B

| Example | ΔP (mm Water) | % Pen | Q |
|---|---|---|---|
| 5 | 15.02 | 17.45 | 0.117 |
| C5 | 15.07 | 26.95 | 0.087 |

The results in Table 7 show that the microfibrillated film made with a beta-nucleating agent, obtained directly from the fluid jet processing, was charged and was effective in filtering particles.

Example 6–7 and Comparative Example C6–7

The highly oriented, microvoided film made in Example 3 was microfibrillated essentially as in Example 3 except three passes at a pressure of 9.6 MPa on each side and two passes per side at a pressure of 13.8 MPa were used, followed by stretching the sample to a width of 22.9 cm and then further microfibrillating with two passes at 13.8 MPa on each side and one pass on each side at 9.6 MPa. The resulting microfibrillated film was tested according to Test Method IIb—Dusting Performance Test, and the results are shown in Table 8. For comparison, additional samples of microfibrillated film were treated with ethanol and then tested according to Test Method IIb. Treatment with ethanol is another known method for removing charge from a material, and was done by soaking the sample in ethanol for 15 minutes followed by air drying. The results are shown in Table 8.

The highly oriented, microvoided film of Example 4 was similarly microfibrillated and tested. The results are shown in Table 8.

TABLE 8

Results of Dust Performance Testing of Microfibrillated Film

| Example | Additive | % Dust Picked Up |
|---------|----------|------------------|
| 6 | None | 45 |
| C6 | None | 29 |
| 7 | CHIMASSORB ™ 944 | 61 |
| C7 | CHIMASSORB ™ 944 | 43 |

The results in Table 8 show that the microfibrillated film, obtained directly from the fluid jet processing, was charged and was effective in picking up dust particles. In addition, the presence of the additive increased dust pick up.

Example 8 and Comparative Example 8

A 70:30 blend (w/w) of high melt-strength polypropylene resin (PF814™, Montell North America, Inc., Wilmington, Del.) and elastomeric polypropylene (ENGAGE™ 8200, DuPont Dow Elastomers LLC, Wilmington, Del.) was mixed with a chemical blowing agent, azodicarbonamide (Aldrich Chemical Co., Milwaukee, Wis.) at 3 weight % in a twin screw extruder at 40 rpm with a temperature profile from 185° C. to 225° C. to 160° C. over the six zones of the extruder, creating pressures from 11.0 MPa to 24.9 MPa. The temperature in the melt pump and neck tube were maintained at 170° C. The polymer melt was extruded through a 15.2 cm wide foam die (available from Extrusion Dies Inc., Canfield, Ohio.), and the resulting foamed polymer was collected on a chrome-plated roll, chilled to 150° C. at a draw rate of approximately 3 meters/minute. The resulting foam sheet had a thickness of approximately 1.1 mm, a density was 0.5000 g/mL, and a cell size of less than 50 μm in largest dimension. Uniaxial orientation in a laboratory-scale batch orienter at 130° C. and a draw ratio of 5:1 produced a soft-feeling oriented foam having a density of 0.5000 g/mL, a thickness of 0.15 mm, and a foam void content (% voids) of 44%.

The oriented foam was microfibrillated as in Example 3, except that two passes per side at a water pressure of 9.6 MPa was use. The resulting microfibrillated foam was tested according to Test Method IIc—Dusting Performance Test, and the results are shown in Table 9.

TABLE 9

Results of Dust Performance Testing of Microfibrillated Foam

| Example | % Dust Picked Up |
|---------|------------------|
| 8 | 51 |
| C8 | 34 |

The results in Table 9 show that the microfibrillated foam, obtained directly from the fluid jet processing, was charged and was effective in picking up dust particles.

What is claimed is:

1. Charged, melt processed, oriented, non-conductive polymeric microfibers having an average effective diameter of less than 20 microns and a transverse aspect ratio of from 1.5:1 to 20:1, wherein the non-conductive polymer of said polymeric microfibers has a volume resistivity of at least $10^{14}$ ohm-cm.

2. The microfibers of claim 1 having a transverse aspect ratio of 3:1 to 9:1.

3. The microfibers of claim 1 having a cross-sectional area of 0.5 $\mu m^2$ to 3.0 $\mu m^2$.

4. The microfibers of claim 1 having a cross-sectional area of 0.7 $\mu m^2$ to 2.1 $\mu m^2$.

5. The microfibers of claim 1 having an average effective diameter of from 0.01 microns to 10 microns.

6. The microfibers of claim 1 having a surface area of at least 0.25 $m^2$/gram.

7. The microfibers of claim 1 having a surface area of 0.5 to 30 $m^2$/gram.

8. The microfibers of claim 1 wherein said melt-processed polymer is selected from the group consisting as polypropylene, polyethylene and poly(4-methyl-1-pentene); polyvinyl chloride; polystyrene; polycarbonates and polyesters, and copolymers and blends thereof.

9. The microfibers of claim 1 further comprising a charge additive.

* * * * *

UNITED STATES PATENT AND TRADEMARK OFFICE
CERTIFICATE OF CORRECTION

PATENT NO. : 6,420,024 B1
APPLICATION NO. : 09/746355
DATED : July 16, 2002
INVENTOR(S) : Perez, Mario A.

It is certified that error appears in the above-identified patent and that said Letters Patent is hereby corrected as shown below:

Column 4,
Line 59, following "polymer" delete ",".

Column 6,
Line 8, delete "750°" and insert in place thereof -- 75° --.

Column 11,
Line 17, delete "witch" and insert in place thereof -- with --.
Line 58, delete "amorphbous" and insert in place thereof -- amorphous --.

Column 14,
Line 11, delete "1to" and insert in place thereof -- 1 to --.
Line 28, delete "99/615201" and insert in place thereof -- 99/61520 --.
Line 50, delete ":al.)." and insert in place thereof -- al.). --.

Column 15,
Line 2, following "the" delete ",".
Line 7, delete "3-methyl- 1hexene" and insert in place thereof -- 3-methyl-1-hexene --.
Line 13, delete "." following "high" and insert in place thereof -- , --.

Column 18,
Line 10, delete "rising" and insert in place thereof -- using --
Line 53, following "dissipate" delete ",".

Column 19,
Line 60, following "surface" delete ",".

Column 21,
Line 43, following "2," delete ",".
Line 46, delete "milcrofibrous" and insert in place thereof -- microfibrous --.
Line 49, following "average" delete ",".
Line 49, following "width" delete ":".

Column 22,
Line 41, following "for" delete ",".

Column 23,
Line 27, delete "TSI8110" and insert in place thereof -- TSI 8110 --.
Line 56, following "pushed" delete ",".

UNITED STATES PATENT AND TRADEMARK OFFICE
CERTIFICATE OF CORRECTION

PATENT NO. : 6,420,024 B1
APPLICATION NO. : 09/746355
DATED : July 16, 2002
INVENTOR(S) : Perez, Mario A.

It is certified that error appears in the above-identified patent and that said Letters Patent is hereby corrected as shown below:

Column 24,
Line 54, delete "la" and insert in place thereof -- a --.

Column 26,
Line 8, following "mm" insert -- , --.

Column 28,
Line 63, delete "C6-7" and insert in place thereof -- C6-C7 --.

Signed and Sealed this

First Day of August, 2006

JON W. DUDAS
*Director of the United States Patent and Trademark Office*